(12) United States Patent
Ito et al.

(10) Patent No.: US 11,183,933 B2
(45) Date of Patent: Nov. 23, 2021

(54) CONTROL DEVICE FOR DC-DC CONVERTER

(71) Applicant: DENSO CORPORATION, Kariya (JP)

(72) Inventors: Mitsutaka Ito, Kariya (JP); Sadahiro Akama, Kariya (JP)

(73) Assignee: DENSO CORPORATION, Kariya (JP)

(*) Notice: Subject to any disclaimer, the term of this patent is extended or adjusted under 35 U.S.C. 154(b) by 71 days.

(21) Appl. No.: 16/744,255

(22) Filed: Jan. 16, 2020

(65) Prior Publication Data

US 2020/0235665 A1 Jul. 23, 2020

(30) Foreign Application Priority Data

Jan. 22, 2019 (JP) .............................. JP2019-008689

(51) Int. Cl.
| | |
|---|---|
| *H02M 3/158* | (2006.01) |
| *B60L 58/10* | (2019.01) |
| *H02M 3/335* | (2006.01) |
| *H02M 1/00* | (2006.01) |

(52) U.S. Cl.
CPC ............. *H02M 3/158* (2013.01); *B60L 58/10* (2019.02); *B60L 2210/10* (2013.01); *H02M 1/00* (2013.01); *H02M 1/0009* (2021.05); *H02M 3/335* (2013.01)

(58) Field of Classification Search
CPC ...... H02M 1/00; H02M 3/158; H02M 1/0009; H02H 7/06–097; H02H 7/1213; H02P 27/06; G01R 19/2506

See application file for complete search history.

(56) References Cited

U.S. PATENT DOCUMENTS

| | | | |
|---|---|---|---|
| 2011/0261589 A1 | 10/2011 | Goto et al. | |
| 2016/0241133 A1 | 8/2016 | Yamakawa et al. | |
| 2016/0241162 A1 | 8/2016 | Yamakawa et al. | |
| 2019/0111911 A1* | 4/2019 | Wang | B60W 30/18127 |
| 2019/0157974 A1 | 5/2019 | Tomita et al. | |

FOREIGN PATENT DOCUMENTS

| | | |
|---|---|---|
| JP | 2003-111203 A | 4/2003 |
| JP | 2010-115056 A | 5/2010 |
| JP | 2011-015603 A | 1/2011 |
| JP | 2015-162939 A | 9/2015 |
| JP | 2015-198460 A | 11/2015 |
| JP | 2016-116389 A | 6/2016 |
| JP | 2017-046495 A | 3/2017 |

* cited by examiner

*Primary Examiner* — Rafael O De Leon Domenech

(74) *Attorney, Agent, or Firm* — Oliff PLC

(57) ABSTRACT

A control device has a first control part and a second control part. The control device is applied to a DC-DC converter. The control device selects a first switch turning-on instruction or a first switch turning-off instruction generated by the first control part during a voltage boost control period, and transmits the selected first switch turning-on instruction or the selected first switch turning-off instruction to a first switch in the DC-DC converter. The control device selects a second switch turning-on instruction or a second switch turning-off instruction generated by the second control part during a voltage step-down control period, and transmits the selected second switch turning-on instruction or the selected second switch turning-off instruction to a second switch in the DC-DC converter.

8 Claims, 13 Drawing Sheets

IL*

IS1*

IS2*

ILr

DS

OUT3 / OUT4

CONTROL DEVICE FOR DC-DC CONVERTER

CROSS-REFERENCE TO RELATED APPLICATION

This application is related to and claims priority from Japanese Patent Application No. 2019-008689 filed on Jan. 22, 2019, the contents of which are hereby incorporated by reference.

TECHNICAL FIELD

The present disclosure relates to control devices for direct current to direct current converters (DC-DC converters).

BACKGROUND

There is a known control device according to a related art which performs a switching control of switching elements in an alternating current to direct current converter (AC-DC converter) based on a peak current mode control, which is a known technique, so as to adjust a reactor current flowing in a reactor in the AC-DC converter to an instruction current. In more detail, the control device adjusts quickly a value of a reactor current (hereinafter, a reactor current value) which flows in the reactor of the AC-DC converter to an instruction current value. This switching control allows the reactor to have an adequate rated current and to prevent a total size of the reactor in the AC-DC convertor from increasing.

There is a direct current to direct current converter (DC-DC converter) of a bidirectional type according to a related art, which performs a voltage boost control and a voltage step-down control. In the voltage boost control, the DC-DC converter receives a direct current voltage (as a low DC voltage) through its low voltage side terminal, and boosts the received DC low voltage to a high DC voltage, and supplies this externally through its high voltage side terminal. In the voltage step-down control, the DC-DC converter receives a high DC voltage through its high voltage side terminal, steps down the received high DC voltage to a low DC voltage, and supplies the low DC voltage to outsides through its low voltage side terminal.

The current flowing in the reactor of the DC-DC converter has an opposite polarity in a voltage boost control period and a voltage step-down control period. The DC-DC converter performs the voltage boost control during the voltage boost control period, and the voltage step-down control during the voltage step-down control period. Accordingly, it is difficult to apply the peak current mode control performed by the AC-DC convertor to the DC-DC converter of a bidirectional type.

SUMMARY

It is desired for the present disclosure to provide a control device having a first control part, a second control part and an operation part. The control device is applied to a direct current to direct current converter, i.e. a DC-DC converter. The operation part in the control device selects a first switch turning-on instruction or a first switch turning-off instruction generated by the first control part during a voltage boost control period, and transmits the selected first switch turning-on instruction or the selected first switch turning-off instruction to a first switch in the DC-DC converter. The operation part in the control device selects a second switch turning-on instruction or a second switch turning-off instruction generated by the second control part during a voltage step-down control period, and transmits the selected second switch turning-on instruction or the selected second switch turning-off instruction to a second switch in the DC-DC converter.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
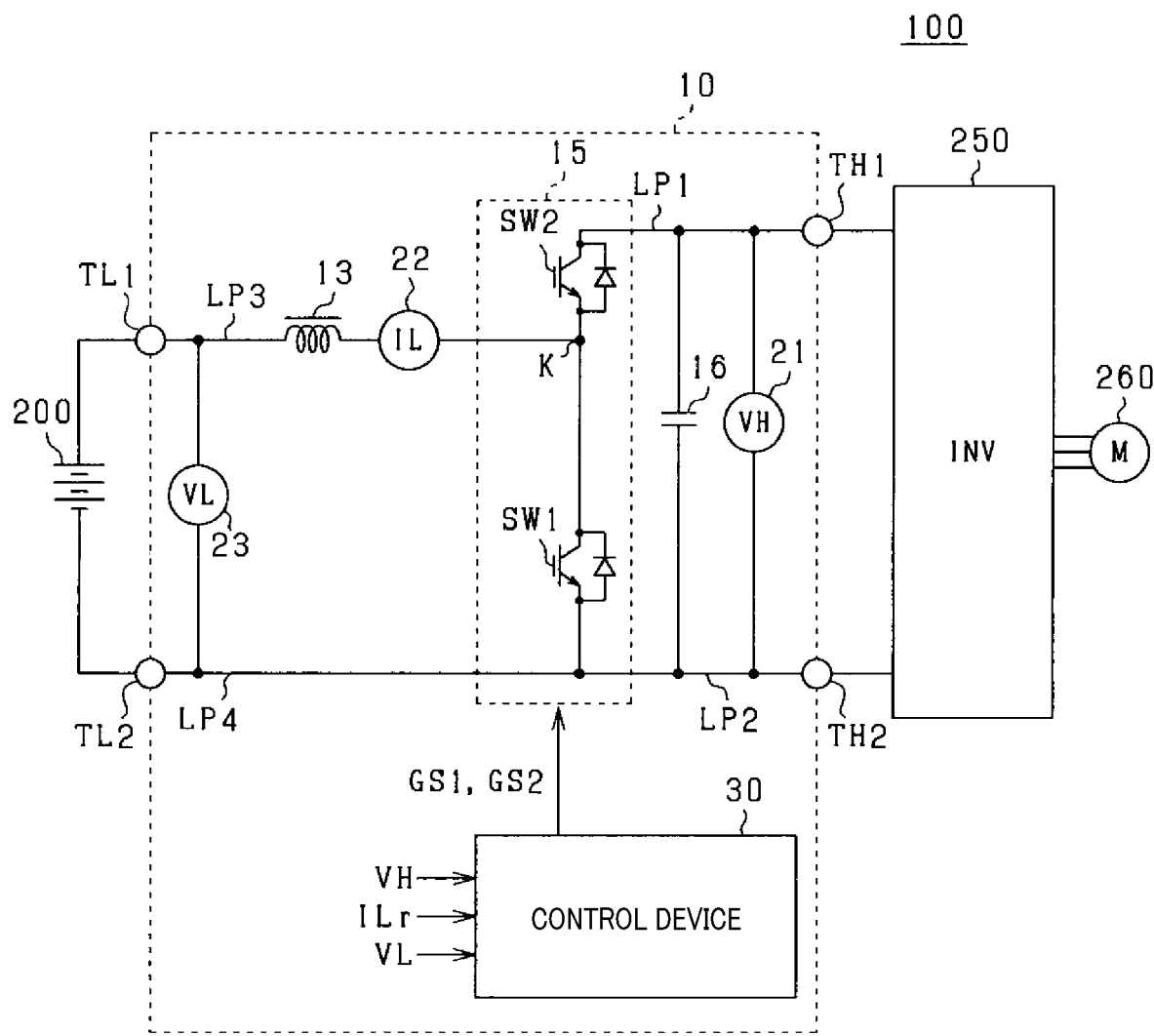
FIG. 1 is a view showing a structure of a power converter system equipped with a DC-DC converter having a control device according to a first exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of a control device for a DC-DC converter 10 according to a first exemplary embodiment of the present disclosure with reference to FIG. 1 to FIG. 6.

FIG. 1 is a view showing a structure of a power converter system 100 equipped with a DC-DC converter 10 having a control device 30 according to the first exemplary embodiment. The DC-DC converter 10 is a power converter for converting a direct current power to a direct current power.

The power converter system 100 is mounted on a motor vehicle, for example, mounted on a hybrid vehicle equipped with an internal combustion engine and a motor 260 shown in FIG. 1. The motor 260 supplies driving power to the motor vehicle.

As shown in FIG. 1, the power converter system 100 is equipped with a battery 200, the DC-DC converter 10 and an inverter 250. The DC-DC converter 10 has a first low voltage side terminal TL1 and a second low voltage side terminal TL2. The first low voltage side terminal TL1 of the DC-DC converter 10 is connected to a positive terminal of the battery 200. The second low voltage side terminal TL2 of the DC-DC converter 10 is connected to a negative terminal of the battery 200.

The power converter system 100 uses a lithium ion battery as the battery 200 which supplies a DC terminal voltage within a range of 200 to 400 V.

The DC-DC converter 10 has a capacitor 16, a half bridge circuit 15, a reactor 13 and first to fourth wirings LP1 to LP4. The DC-DC converter 10 has a first high voltage side terminal TH1 and a second high voltage side terminal TH2. The first high voltage side terminal TH1 of the DC-DC converter 10 is connected to a first terminal of the first wiring LP1. The second high voltage side terminal TH2 of the DC-DC converter 10 is connected to a first terminal of the second wiring LP2.

The capacitor 16 is arranged between the first high voltage side terminal TH1 and the second high voltage side terminal TH2. That is, as shown in FIG. 1, the first high voltage side terminal TH1 and the second high voltage side terminal TH2 are connected together through the capacitor 16.

The half bridge circuit 15 is connected to a second terminal of the first wiring LP1 and a second terminal of the second wiring LP2.

The half bridge circuit 15 has a first switch SW1 and a second switch SW2. Each of the first switch SW1 and the second switch SW2 is composed of an insulated gate bipolar transistor (IGBT), i.e. as a voltage drive-type switch. An emitter of the second switch SW2 is connected to a collector of the first switch SW1. A collector of the second switch SW2 is connected to the first wiring LP1. An emitter of the first switch SW1 is connected to the second wiring LP2. Each of the first switch SW1 and the second switch SW2 is equipped with a free wheel diode connected in reverse to the corresponding switch.

As shown in FIG. 1, the emitter of the first switch SW1 is connected to the collector of the first switch SW1 through a connection node K. A first terminal of the third wiring LP3 is also connected to the connection node K. The reactor 13 is connected to the third wiring LP3. The first terminal of the fourth wiring LP4 is connected to the emitter of the first switch SW1. The second terminal of the third wiring LP3 is connected to the first low voltage side terminal TL1. The second terminal of the fourth wiring LP3 is connected to the second low voltage side terminal TL2.

The DC-DC converter 10 further has a first voltage sensor 21, a current sensor 22 and a second voltage sensor 23. The first voltage sensor 21 detects, as a high voltage level VH, a DC voltage between the first high voltage side terminal TH1 and the second high voltage side terminal TH2.

The current sensor 22 is arranged on the third wiring LP3, and detects, as a reactor current, a current which is flowing in the reactor 13.

The second voltage sensor 23 detects, as a low side voltage VL, a DC voltage between the positive terminal and the negative terminal of the battery 200.

The inverter 250 is connected to the first high voltage side terminal TH1 and the second high voltage side terminal TH2 of the DC-DC converter 10. The inverter 250 converts a DC voltage to an alternating current voltage (AC voltage), and an AC voltage to a DC voltage. The inverter 250 is connected to the motor 260 as a three phase AC motor. The motor 260 has two functions, one function for generating a drive torque so as to drive a motor vehicle, and the other function for converting kinetic energy of the motor vehicle to regenerative electric power.

During the powering operation mode of the motor 260, the DC-DC converter 10 boosts a DC voltage supplied form the battery 200, and supplies the boosted DC voltage to the inverter 250. The inverter 250 converts the boosted DC voltage to an AC voltage, and supplies the AC voltage to the motor 260.

During the regenerative operation mode of the motor 260, the inverter 250 converts an AC current, which is a regenerative operation mode of the motor 260 which generates electric power, to a DC current. The inverter 250 supplies a DC voltage to the DC-DC converter 10. The DC-DC converter 10 performs the voltage step-down control of the received DC voltage, and supplies the reduced DC voltage to the battery 200 so as to charge the battery 200.

The DC-DC converter 10 has the control device 30. The control device 30 according to the first exemplary embodiment generates and transmits a first gate signal GS1 and a second gate signal GS2. The turning on/off operation of the first switch SW1 is performed on the basis of the first gate signal GS1. Similarly, the turning on/off operation of the second switch SW2 is performed on the basis of the second gate signal GS2.

Figure 2:
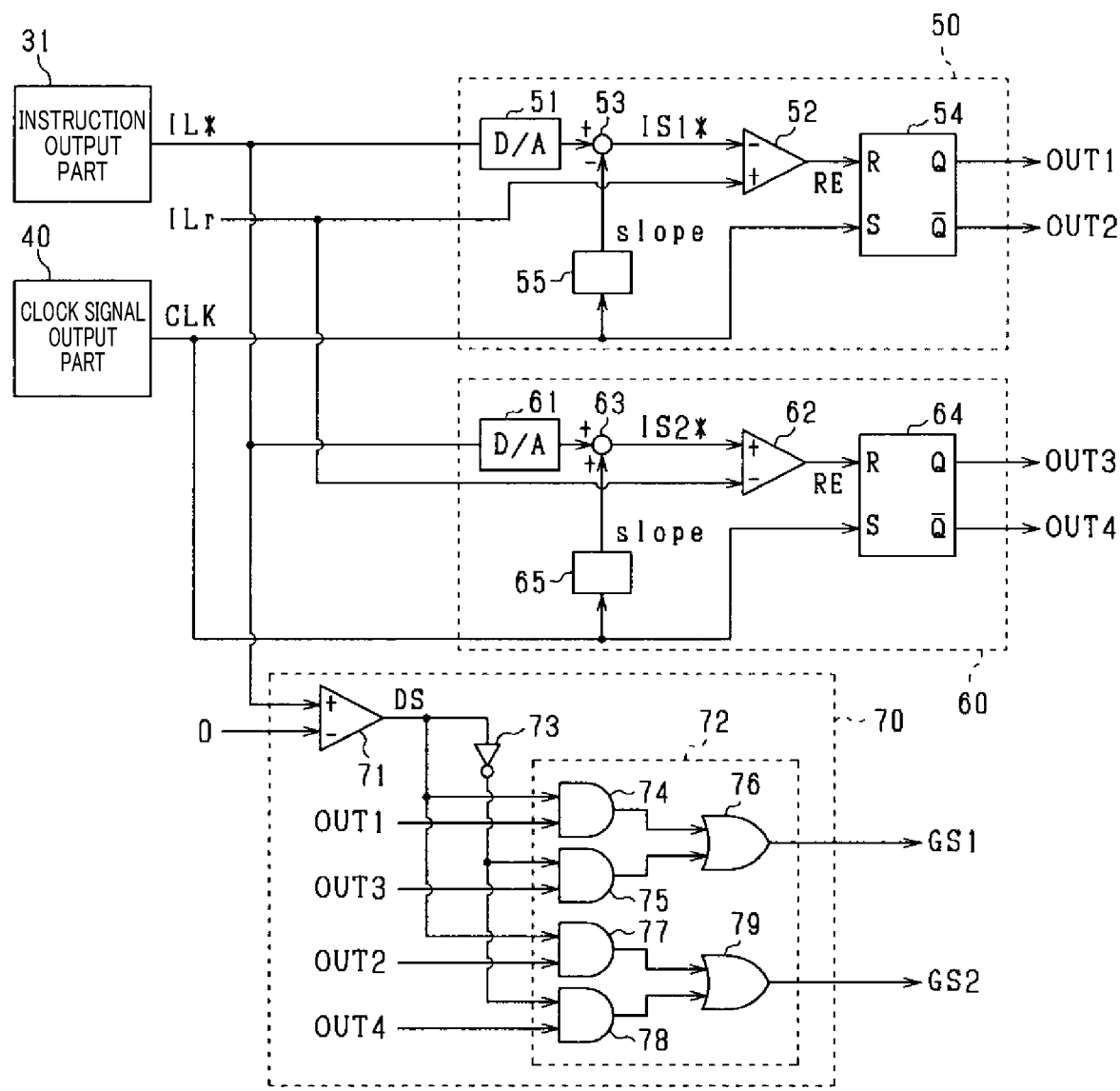
FIG. 2 is a view showing functional blocks of a control device in the DC-DC converter according to the first exemplary embodiment shown in FIG. 1.

FIG. 2 is a view showing functional blocks of the control device 30 in the DC-DC converter 10 according to the first exemplary embodiment shown in FIG. 1. As shown in FIG. 2, the control device 30 has an instruction output part 31 which generates and transmits an instruction current IL* as an instruction value of the reactor current ILr.

The instruction output part 31 in the control device 30 generates and transmits the instruction current to the DC-DC converter 10 to be used during the voltage boost control. Further, the instruction output part 31 generates and transmits the instruction current IL* to the DC-DC converter 10 to be used during the voltage step-down control.

For example, the instruction output part 31 detects a voltage boost control period and a voltage step-down control period on the basis of an instruction signal transmitted from an electronic control unit (not shown) arranged at a higher control layer. The DC-DC converter 10 performs the voltage boost control during the voltage boost control period, and performs the voltage step-down control during the voltage step-down control period.

It is possible to realize the functions of the control device 30 on the basis of software programs, hardware such as a computer and devices, or a combination of hardware and software programs. The software programs are stored in a memory device in a computer. A computer performs the software programs stored in the memory device so as to realize the functions of the control device 30.

The control device 30 performs a peak current mode control which turns on/off the first switch SW1 so as to change a reactor current ILr to the instruction current IL* during the voltage boost control. Further, the control device 30 performs the peak current mode control which turns on/off the second switch SW2 so as to change the reactor current ILr to the instruction current IL* during the voltage step-down control.

In more detail, the control device 30 according to the first exemplary embodiment turns on the first switch SW1 during the voltage boost control, and turns on the second switch SW2 during the voltage step-down control.

The control device 30 comprises a current acquisition part, a first voltage acquisition part and a second voltage acquisition part.

In the structure of the DC-DC converter 10 according to the first exemplary embodiment, a current flowing in the reactor 13 in the voltage boost control and a current flowing in the reactor 13 during the voltage step-down control have a different polarity.

During the voltage boost control, a current flows in the reactor 13 from the first low voltage side terminal TL1 to the connection node K. On the other hand, during the voltage step-down control, a current flows in the reactor 13 from the connection node K to the first low voltage side terminal TL1.

In the following description, the current flowing in the reactor 13 from the first low voltage side terminal TL1 to the connection node K has a positive polarity, and the current flows in the reactor 13 from the connection node K to the first low voltage side terminal TL1 has a negative polarity.

A description will be given of the instruction IL* transmitted from the instruction output part 31 in the control device 30 with reference to FIG. 3A and FIG. 3B.

Figure 3A:
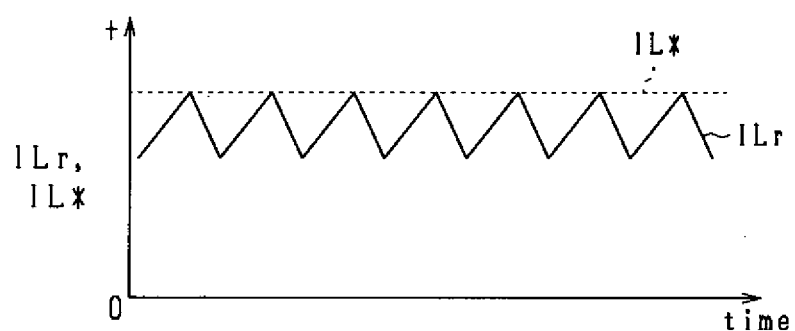
FIG. 3A and FIG. 3B show a relationship between a reactor current and an instruction value in the DC-DC converter according to the first exemplary embodiment.
Figure 3B:
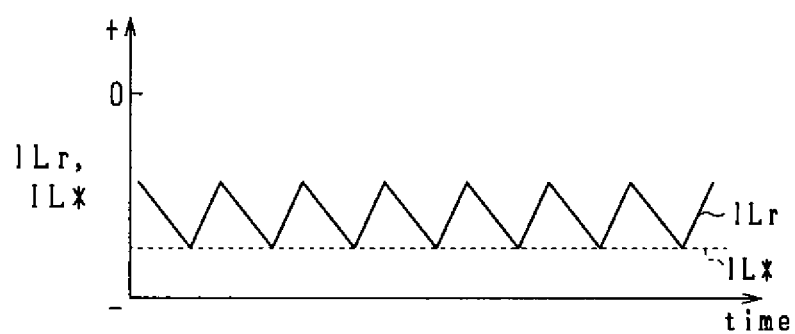

FIG. 3A and FIG. 3B show a relationship between the reactor current ILr and the instruction value IL* used in the DC-DC converter 10 according to the first exemplary embodiment;

During the voltage boost control period shown in FIG. 3A, the reactor current ILr flowing in the reactor 13 has a positive polarity. The instruction output part 31 in the control device 30 generates and transmits the instruction current IL* of a positive value so as to adjust the reactor current ILr of the positive polarity. Specifically, the instruction current IL* used in the voltage boost control is determined on the basis of a voltage supplied from the DC-DC converter 10 to the inverter 250.

As shown in FIG. 3A, during the voltage step-down control period, the reactor current ILr flowing in the reactor 13 has a negative polarity. The instruction output part 31 in the control device 30 generates and transmits the instruction current IL* of a negative value so as to adjust the reactor current ILr of the positive polarity. Specifically, the instruction current IL* used in the voltage step-down control is determined on the basis of a voltage supplied to the battery 200 in the voltage step-down control performed by the DC-DC converter 10.

In the peak current mode control, the control device 30 switches the turning-on instruction and the turning-off instruction of each of the first gate signal GS1 and the second gate signal GS2 on the basis of a comparison result between the reactor current ILr and the instruction current IL*. Accordingly, when the polarity of the reactor current flowing in the reactor 13 varies, it is necessary for the control device 30 to switch the behavior of the peak current mode control.

The control device 30 according to the first exemplary embodiment has a first control part 50, a second control part 60, a clock signal output part 40 (or a clock signal generator 40) and an operation part 70 so as to correctly continue the peak current mode control before and after the variation in polarity of the reactor current ILr.

The first control part 50 generates and transmits a first output signal OUT1 and a second output signal OUT2 during the peak current mode control using the reactor current ILr and the instruction current IL*. The operation state of the first switch SW1 is determined on the basis of the first output signal OUT1. The operation state of the second switch SW2 is determined on the basis of the second output signal OUT2.

The first switch SW1 is turned on during a high voltage level of the first output signal OUT1. On the other hand, the first switch SW1 is turned off during a low voltage level of the first output signal OUT1.

The second switch SW2 is turned on during a high voltage level of the second output signal OUT2. On the other hand, the second switch SW2 is turned off during a low voltage level of the second output signal OUT2.

As shown in FIG. 2, the first control part 50 has a first digital to analogue converter 51 (first DA converter 51), a first comparator 52, a subtractor 53, a first RS flip flop 54, and a first compensator 55.

The first DA converter 51 receives the instruction current IL* transmitted from the instruction output part 31. The first DA converter 51 converts the received instruction current IL* in digital form to the instruction current IL* in analog form. The first DA converter 51 transmits the instruction current IL* in analogue form to the subtractor 53. The subtractor 53 subtracts a slope compensation signal Slope determined by the first compensator 55 from the received instruction current IL* in analogue form, and transmits a first compensated instruction value IS1* as a subtraction result to an inverting input terminal of the first comparator 52. It is possible to suppress an oscillation due to variation of the reactor current flowing in the reactor 13 from occurring on the basis of the slope compensation signal Slope. The reactor current ILr detected by the current sensor 22 is transmitted to a non-inverting input terminal of the first comparator 52.

The first comparator 52 compares the reactor current ILr with the first compensated instruction value IS1*, and generates and transmits a reset signal RE of a low voltage level until the reactor current ILr reaches the first compensated instruction value IS1*.

Further, the first comparator 52 generates and transmits the reset signal RE of a high voltage level when the reactor current ILr has reached the first compensated instruction value IS1*.

The first RS flip-flop 54 receives the clock signal CLK transmitted from the clock signal output part 40 through its S terminal. The switching timing when each of the first output signal OUT1 and the second output signal OUT2 is turned on is determined on the basis of the clock signal CLK. Further, a switching period Tsw is determined on the basis of the clock signal CLK.

The first RS flip-flop 54 generates and transmits the first output signal OUT1 through its Q terminal, and transmits the second output signal OUT2 through its inverting terminal Q.

The second control part 60 generates and transmits a third output signal OUT3 and a fourth output signal OUT4 during the peak current mode control using the reactor current ILr and the instruction current IL*. The operation state of the first switch SW1 is determined on the basis of the third output signal OUT3. The operation state of the second switch SW2 is determined on the basis of the fourth output signal OUT4.

The first switch SW1 is turned on during a high voltage level of the third output signal OUT3. On the other hand, the first switch SW1 is turned off during a low voltage level of the third output signal OUT3.

The second switch SW2 is turned on during a high voltage level of the fourth output signal OUT4. On the other hand, the second switch SW2 is turned off during a low voltage level of the fourth output signal OUT4.

As shown in FIG. 2, the second control part 60 has a second DA converter 61, a second comparator 62, an adder 63, a second RS flip flop 64 and a second compensator 65.

The second DA converter 61 receives the instruction current IL* transmitted from the instruction output part 31. The second DA converter 61 converts the received instruction current IL* in digital form to the instruction current IL* in analog form. The second DA converter 61 transmits the instruction current IL* in analogue form to the adder 63. The adder 63 adds the slope compensation signal Slope determined by the second compensator 65 to the received instruction current IL* in analogue form, and transmits a second compensated instruction value IS2* as an addition result to an inverting input terminal of the second comparator 62. The reactor current ILr detected by the current sensor 22 is transmitted to an inverting input terminal of the second comparator 62.

In the structure of the control device 30 according to the first exemplary embodiment, the first compensator 55 generate and transmit the slope compensation signal Slope which is the same in voltage level with the slope compensation signal Slope generated and transmitted by the second compensator 65.

The second compensator 65 compares the reactor current ILr with the second compensated instruction value IS2*, and generates and transmits the reset signal RE of a low voltage level until the reactor current ILr reaches the second compensated instruction value IS2*.

Further, the second comparator 52 generates and transmits the reset signal RE of a high voltage level when the reactor current ILr has reached the second compensated instruction value IS2*.

The second RS flip-flop 64 receives the clock signal CLK transmitted from the clock signal output part 40 through its S terminal. The second RS flip-flop 64 generates and transmits the third output signal OUT3 through its Q terminal, and transmits the fourth output signal OUT4 through its inverting terminal $\overline{Q}$.

The operation part 70 has a judgment part 71, an output selection part 72 and an inverter 73.

The judgment part 71 receives the instruction current IL* transmitted from the instruction output part 31. When the received instruction current IL* has a positive value, the judgment part 71 generates and transmits a judgment signal DS of a high voltage level. On the other hand, when the received instruction current IL* has a negative value, the judgment part 71 generates and transmits the judgment signal DS of a low voltage level.

The output selection part 72 receives the first output signal OUT1 and the second output signal OUT2 transmitted from the first control part 50, and the third output signal OUT3 and the fourth output signal OUT4 transmitted from the second control part 60. Specifically, a first AND circuit 74 in the operation part 70 receives the first output signal OUT1. A third AND circuit 77 in the operation part 70 receives the second output signal OUT2. A second AND circuit 75 in the operation part 70 receives the third output signal OUT3. A fourth AND circuit 78 in the operation part 70 receives the fourth output signal OUT4

The first AND circuit 74 and the third AND circuit 77 receive the judgment signal DS transmitted from the judgment part 71. The judgment signal DS transmitted from the judgment part 71 is inverted by the inverter 73. The second AND circuit 75 and the fourth AND circuit 78 receive the inverted judgment signal.

The output selection part 72 has a first OR circuit 76 and a second OR circuit 79.

The first OR circuit 76 receives the output signal of the first AND circuit 74 and the output signal of the second AND circuit 75. The first OR circuit 76 generates and transmits its output signal as the first ages signal GS1.

The second OR circuit 79 receives the output signal of the third AND circuit 77 and the output signal of the fourth AND circuit 78. The second OR circuit 79 generates and transmits its output signal as the second gate signal GS2.

During a period in which the judgment part 71 receives the instruction current IL* of a positive value, the first AND circuit 74 and the third AND circuit 77 receive the judgment signal DC of a high voltage level, and the second AND circuit 75 and the fourth AND circuit 78 receive the judgment signal DS of a low voltage level. In this situation, the first OR circuit 76 transmits the first output signal OUT1 as the first gate signal GS1, and the second OR circuit 79 transmits the second output signal OUT2 as the second gate signal GS2.

On the other hand, during a period in which the judgment part 71 receives the instruction current IL* of a negative value, the first AND circuit 74 and the third AND circuit 77 receive the judgment signal DC of a low voltage level, and the second AND circuit 75 and the fourth AND circuit 78 receive the judgment signal DS of a high voltage level. In this situation, the first OR circuit 76 transmits the third output signal OUT3 as the first gate signal GS1, and the second OR circuit 79 transmits the fourth output signal OUT4 as the second gate signal GS2.

A description will be given of the behavior of the DC-DC converter 10 with reference to FIG. 4A to FIG. 5F.

Figure 4A:
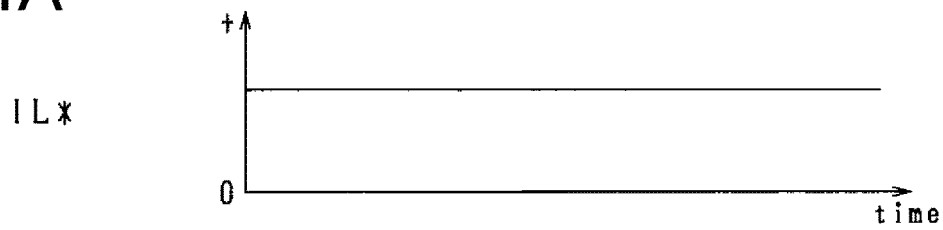
FIG. 4A to FIG. 4F are timing charts showing behavior of the DC-DC converter during a powering operation mode of a motor in a motor vehicle shown in FIG. 1.
Figure 4B:
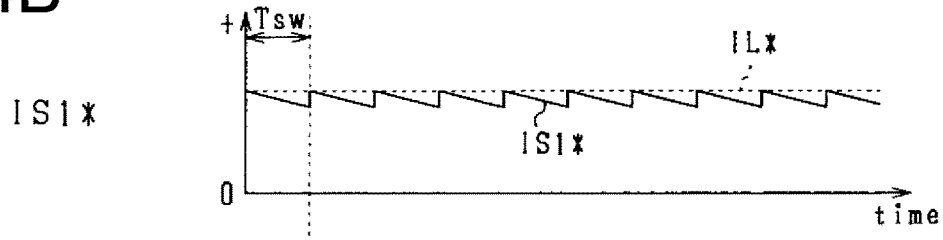
Figure 4C:
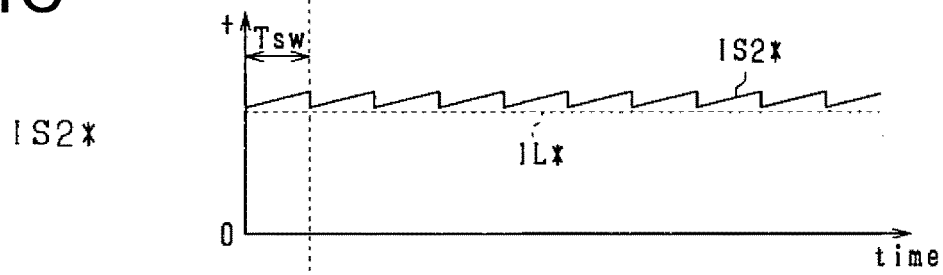
Figure 4D:
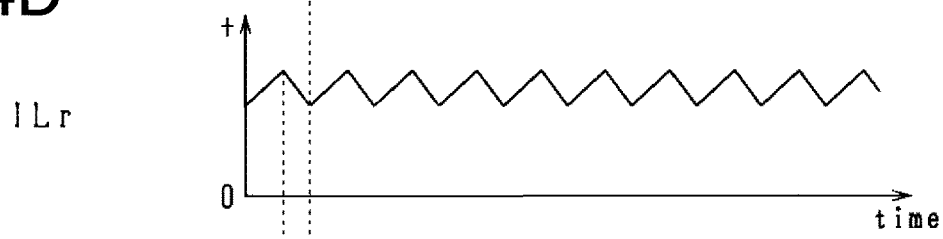
Figure 4E:
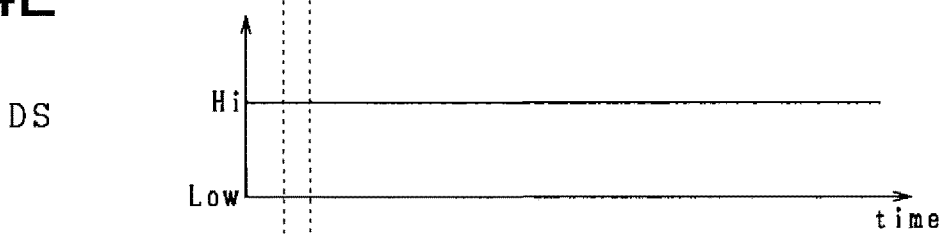
Figure 4F:
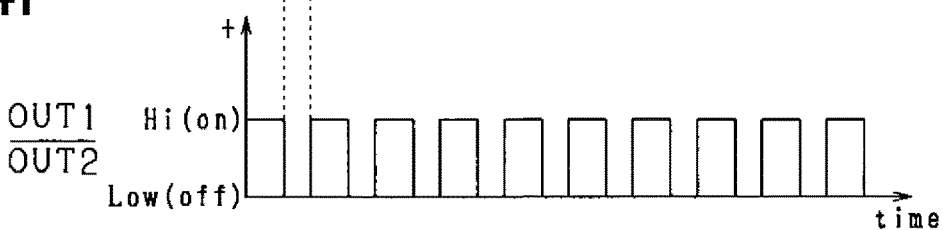

FIG. 4A to FIG. 4F are timing charts showing the behavior of the DC-DC converter 10 during a powering operation mode of the motor 260 in the motor vehicle shown in FIG. 1. In particular, FIG. 4A shows a transition of the instruction current IL*. FIG. 4B shows a transition of the first compensated instruction value IS1*. FIG. 4C shows a transition of the second compensated instruction value IS2*. FIG. 4D shows a transition of the reactor current ILr. FIG. 4E shows a transition of the judgment signal DS. FIG. 4F shows the first output signal OUT1 and a logical inverted value of the second output signal OUT2.

Because the DC-DC converter 10 performs the voltage boost control during the powering operation mode of the motor 260, the reactor current ILr has a positive polarity and the instruction output part 31 generates and transmits the instruction current IL* of a positive value. Accordingly, each of the first compensated instruction value IS1* and the second compensated instruction value IS2* becomes a positive value. The first compensated instruction value IS1* is obtained by subtracting the slope compensation signal Slope from the instruction current IL* of a positive value. The second compensated instruction value IS2* is obtained by adding the slope compensation signal Slope to the instruction current IL*.

During the voltage boost control, the first control part 50 performs the peak current mode control using the first compensated instruction value IS1* and the reactor current ILr of a positive polarity, and generates and transmits the first output signal OUT1 and the second output signal OUT2.

During the switching period Tsw, when the reactor current IL4 does not reach the first compensated instruction value IS1*, the first control part 50 transmits the first output signal OUT1 of a high voltage level, and the second output signal OUT2 of a low voltage level.

On the other hand, when the reactor current ILr has reached the first compensated instruction value IS1* during the switching period Tsw, the first control part 50 transmits the first output signal OUT1 of a low voltage level, and the second output signal OUT2 of a high voltage level.

The second control part 60 performs the peak current mode control using the second compensated instruction value IS2* and the reactor current ILr of a positive polarity, and generates and transmits the third output signal OUT3 and the fourth output signal OUT4.

During the switching period Tsw, when the reactor current IL4 does not reach the second compensated instruction value IS2*, the second control part 60 transmits the third output signal OUT3 of a low voltage level, and the fourth output signal OUT4 of a high voltage level.

On the other hand, when the reactor current ILr has reached the second compensated instruction value IS2* during the switching period Tsw, the second control part 60 transmits the third output signal OUT3 of a high voltage level, and the fourth output signal OUT4 of a low voltage level.

In the period in which the DC-DC converter 10 performs the voltage boost control, because the instruction current IL* has a positive value, judgment part 71 generates and transmits the judgment signal DS of a high voltage level. As shown in FIG. 4F, the operation part 70 receives the first output signal OUT1, the second output signal OUT2, the third output signal OUT3 and the fourth output signal OUT4, and selects and transmits the first output signal OUT1 to the first switch SW1, and selects and transmits the second output signal OUT2 to the second switch SW2. That is, the gate of the first switch SW1 receives the first output signal OUT1 as the first gate signal GS1, and the gate of the second switch SW2 receives the second output signal OUT2 as the second gate signal GS2.

Figure 5A:
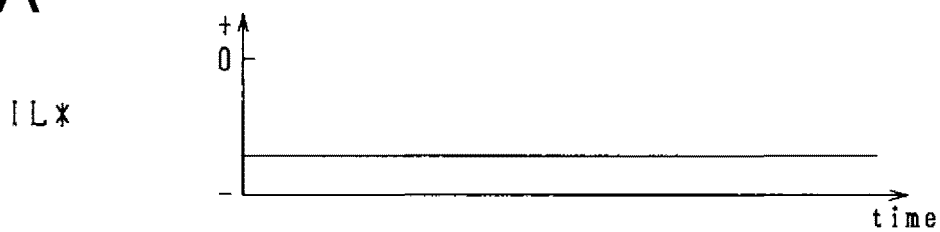
FIG. 5A to FIG. 5F are timing charts showing behavior of the DC-DC converter during a regenerative operation mode of the motor in the motor vehicle shown in FIG. 1.
Figure 5B:
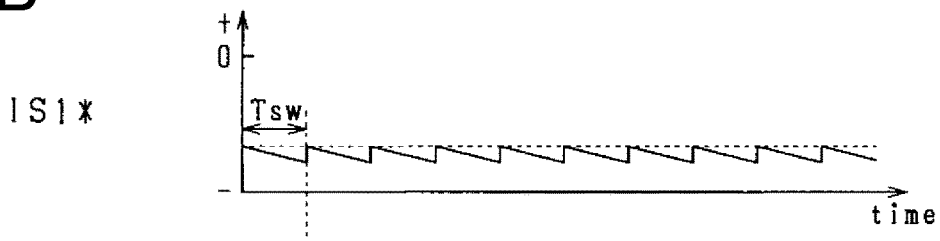
Figure 5C:
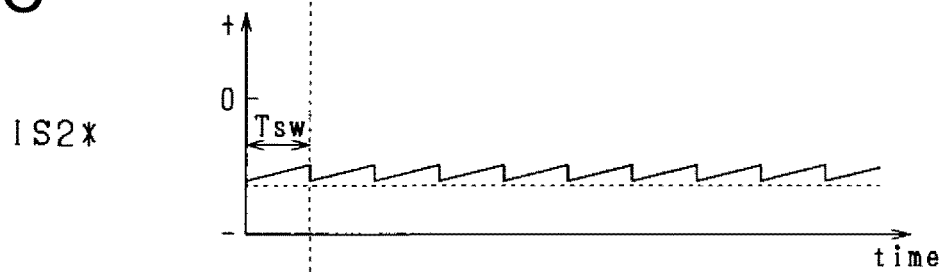
Figure 5D:
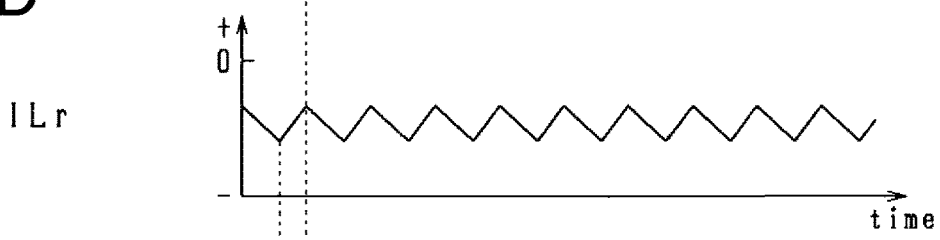
Figure 5E:
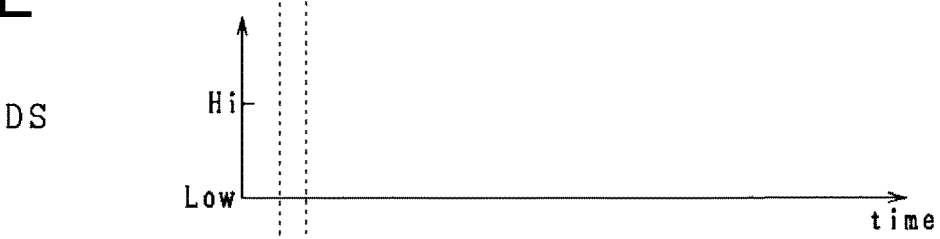
Figure 5F:
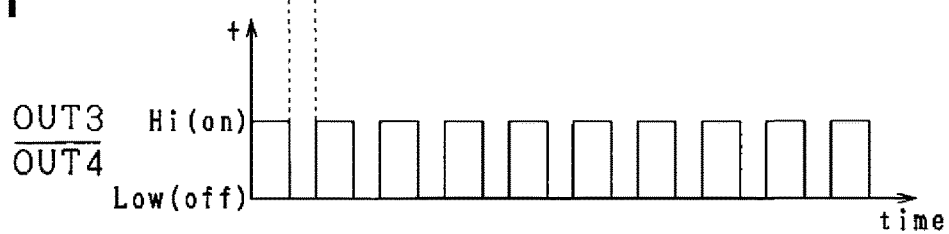

FIG. 5A to FIG. 5F are timing charts showing the behavior of the DC-DC converter 10 during a regenerative operation mode of the motor 260 in the motor vehicle shown in FIG. 1. In particular, FIG. 5A to FIG. 5E correspond the respective FIG. 4A to FIG. 5E. FIG. 5F shows the third output signal OUT3 and a logical inverted value of the fourth output signal OUT4.

Because the DC-DC converter 10 performs the voltage step-down control during the regenerative operation mode of the motor 260, the reactor current ILr has a negative polarity and the instruction output part 31 generates and transmits the instruction current IL* of a negative value. Accordingly, each of the first compensated instruction value IS2* and the second compensated instruction value IS2* becomes a negative value. The first compensated instruction value IS1* is obtained by subtracting the slope compensation signal Slope from the instruction current IL* of a negative value. The second compensated instruction value IS2* is obtained by adding the slope compensation signal Slope to the instruction current IL*.

During the voltage step-down control, the first control part 50 performs the peak current mode control using the first compensated instruction value IS1* and the reactor current ILr of a negative polarity, and generates and transmits the first output signal OUT1 and the second output signal OUT2.

The second control part 60 performs the peak current mode control using the second compensated instruction value IS2* and the reactor current ILr of a negative polarity, and generates and transmits the third output signal OUT3 and the fourth output signal OUT4.

In the period in which the DC-DC converter 10 performs the voltage step-down control, because the instruction current IL* has a negative value, the judgment part 71 generates and transmits the judgment signal DS of a low voltage level. As shown in FIG. 5F, the operation part 70 receives the first output signal OUT1, the second output signal OUT2, the third output signal OUT3 and the fourth output signal OUT4, and selects and transmits the third output signal OUT3 to the third switch SW3, and selects and transmits the fourth output signal OUT4 to the fourth switch SW4. That is, the gate of the first switch SW1 receives the third output signal OUT3 as the first gate signal GS1, and the gate of the second switch SW2 receives the fourth output signal OUT4 as the second gate signal GS2.

The control device 30 in the DC-DC converter 10 according to the first exemplary embodiment has the following effects.

The DC-DC converter 10 has the first control part 50 and the second control part 60 which are operating simultaneously in parallel. During the voltage boost control period, the first output signal OUT1 and the second output signal OUT2 transmitted from the first control part 50 are selected as the gate signal of the firsts witch SW1. On the other hand, the regenerative operation period, the first output signal OUT1 and the second output signal OUT2 transmitted from the second control part 60 are selected as the gate signal of the second witch SW2. Accordingly, it is possible for the control device 30 to quickly switch, according to the variation of the polarity of the reactor current ILr, the turning on/off control of the first switch SW1 based on the reactor current ILr of a positive polarity and the turning on/off control of the second switch SW2 based on the reactor current ILr of a negative polarity. This allows the control device 30 to continuously and smoothly perform the peak current mode control before and after the change in polarity of the reactor current ILr.

First Modification of the Control Device According to the First Exemplary Embodiment A description will be given of a first modification of the control device according to the first exemplary embodiment with reference to FIG. 6.

Figure 6:
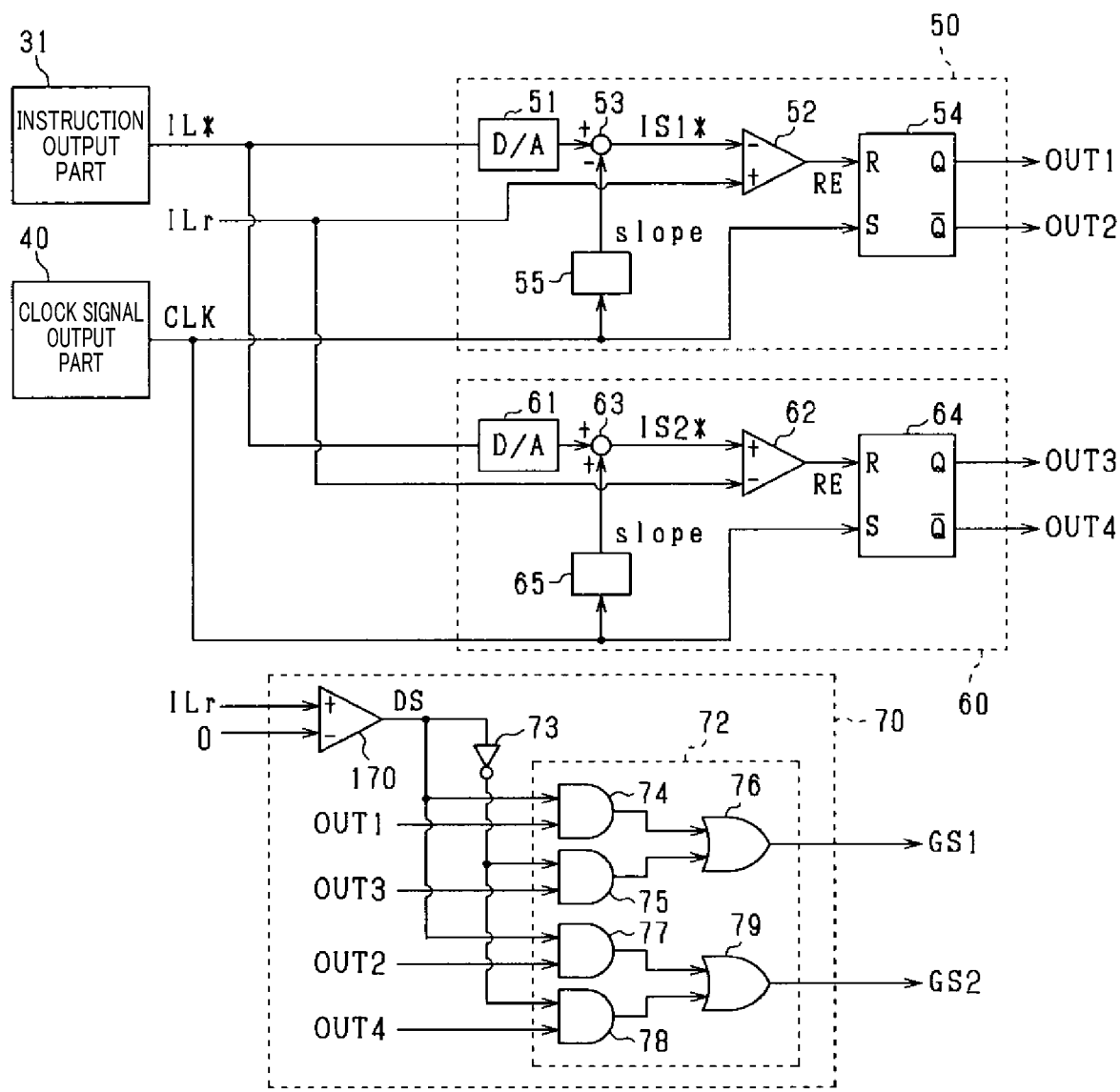
FIG. 6 is a view showing functional blocks of the control device as a modification of the control device according to the first exemplary embodiment shown in FIG. 1.
Figure 7:
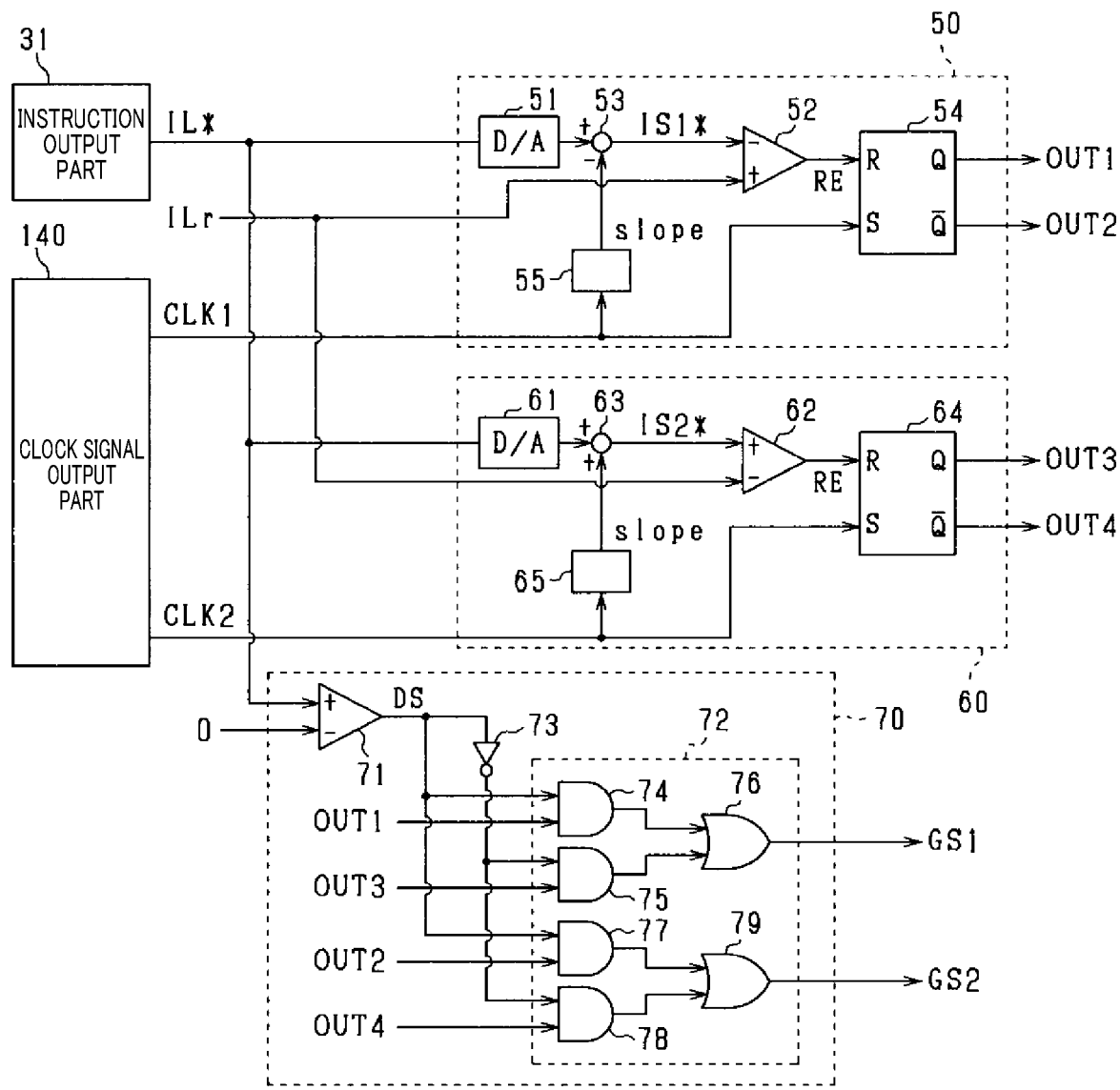
FIG. 7 is a view showing functional blocks of the control device in the DC-DC converter according to a second exemplary embodiment of the present disclosure.

FIG. 6 is a view showing functional blocks of the control device 30-1 as the first modification of the control device 30 according to the first exemplary embodiment shown in FIG. 1. As shown in FIG. 7, the operation part 70 has a modified judgment part 170 which receives the reactor current ILr which is detected by the current sensor 22.

The modified judgment part 170 generated and transmits the judgment signal DS of a high voltage level when the received reactor current ILr has a positive polarity. On the other hand, the modified judgment part 170 generated and transmits the judgment signal DS of a low voltage level when the received reactor current ILr has a negative polarity.

During the period in which the reactor current ILr has a positive polarity, the first AND circuit 74 and the third AND circuit 77 receive the judgment signal DS of a high voltage level, and the second AND circuit 75 and the fourth AND circuit 78 receive the judgment signal DS of a low voltage level.

On the other hand, during the period in which the reactor current ILr has a negative polarity, the first AND circuit 74 and the third AND circuit 77 receive the judgment signal DS of a low voltage level, and the second AND circuit 75 and the fourth AND circuit 78 receive the judgment signal DS of a high voltage level.

As previously described, the control device 30-1 according to the first modification of the first exemplary embodiment has the same effects as the control device 30 according to the first exemplary embodiment.

Second Modification of the Control Device According to the First Exemplary Embodiment A description will be given of a second modification of the control device according to the first exemplary embodiment. It is acceptable to arrange the current sensor 22 on the fourth wiring LP4, instead of being arranged on the third wiring LP3 shown in FIG. 1.

The control device according to the second modification of the first exemplary embodiment has the same effects as the control device 30 according to the first exemplary embodiment.

Second Exemplary Embodiment

A description will be given of the control device 30-2 according to a second exemplary embodiment of the present disclosure with reference to FIG. 7 and FIG. 8A to FIG. 8D.

FIG. 7 is a view showing functional blocks of the control device 30-2 in the DC-DC converter 10 according to the second exemplary embodiment of the present disclosure.

As shown in FIG. 7, the control device 30-2 according to the second exemplary embodiment has a clock signal output part 140.

The clock signal output part 140 transmits a first clock signal CLK1 to the first control part 50, and transmits a second clock signal CLK2 to the second control part 60. As shown in FIG. 7, the first compensator 55 and the set terminal S of the first RS flip flop 54 receive the first clock signal CLK1 transmitted from the clock signal output part 140. The second compensator 65 and the set terminal S of the second RS flip flop 64 receive the second clock signal CLK2 transmitted from the clock signal output part 140.

FIG. 8A to FIG. 8F are timing charts showing behavior of the DC-DC converter 10 having the control device 30-2 according to the second exemplary embodiment shown in FIG. 7.

Figure 8A:
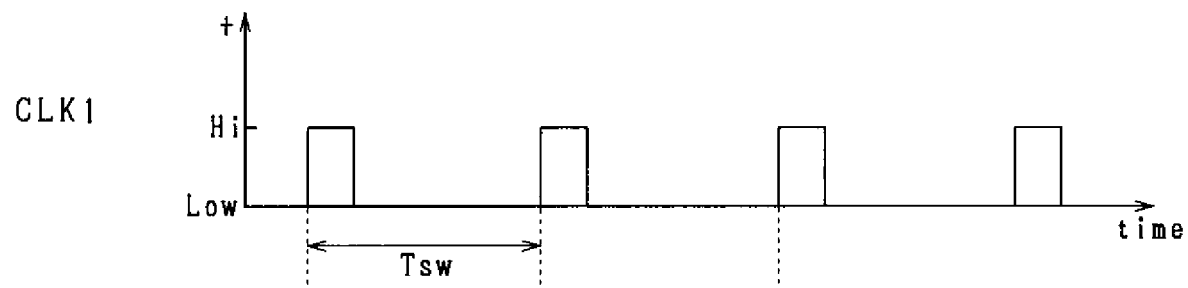
FIG. 8A to FIG. 8D are timing charts showing behavior of the DC-DC converter having the control device shown in FIG. 7.
Figure 8B:
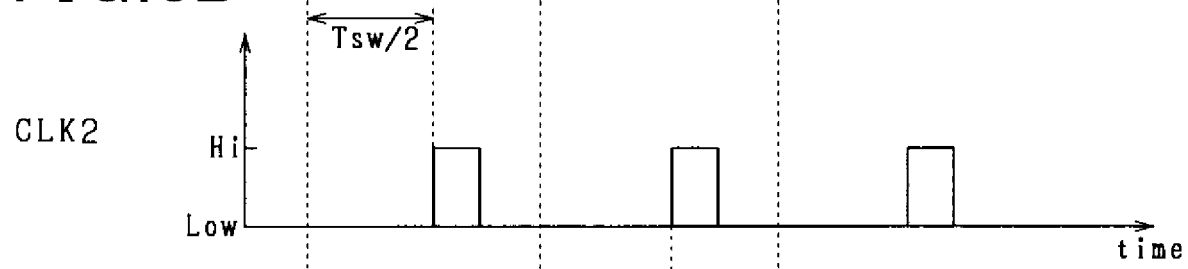

As shown in FIG. 8A and FIG. 8B, the first clock signal CLK1 and the second clock signal CLK2 have the same period. One period of each of the first clock signal CLK1 and the second clock signal CLK2 corresponds to the switching period Tsw of each of the first switch SW1 and the second switch SW2. A rising time when the second clock signal CLK2 rises is elapsed from the rising time when the first clock signal CLK1 rises by a half (Tsw/2) of the switching period Tsw.

The reason why the first clock signal CLK1 is shifted in phase from the second clock signal CLK2 is as follows.

When the timing when the first control part 50 transmits the first output signal OUT1 representing the turning-on operation and the timing when the second control part 60 transmits the third output signal OUT3 representing the turning-on operation occurs simultaneously, there is a possible problem in which the gate signal due to a polarity change of the reactor current ILr becomes delayed from the timing when the reactor current ILr changes in polarity.

In order to avoid the problem previously described, the control device 30-2 according to the second exemplary embodiment instructs the second control part 60 to transmit the third output signal OUT3 representing the turning-on operation at a timing which is delayer or shifted by the half (Tsw/2) of the switching period TSw from the timing when the first output signal OUT1 representing the turning-on operation.

Figure 8C:
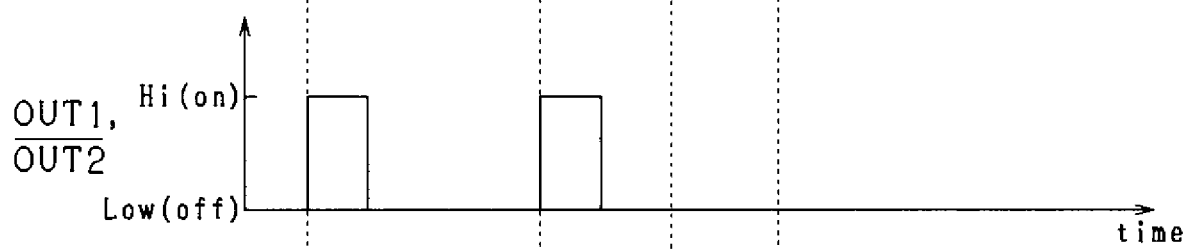
Figure 8D:
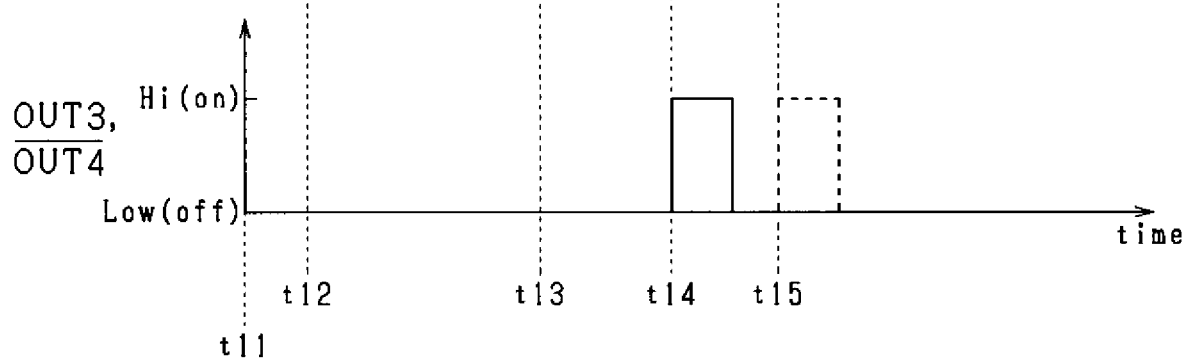

FIG. 8A shows a transition of the first clock signal CLK1. FIG. 8B shows a transition of the second clock signal CLK2. FIG. 8C shows a transition of the first output signal OUT1 and a transition of the inverted second output signal OUT2. FIG. 8D shows a transition of the third output signal OUT3 and a transition of the inverted fourth output signal OUT 4.

As shown in FIG. 8A to FIG. 8D, the reactor current ILr has a positive polarity during a period from the timing t11 to the timing t13. Accordingly, the first control part 50 transmits the first output signal OUT1 as the first gate signal GS1 and the second output signal OUT2 as the second gate signal GS2, where the first output signal OUT1 and the second output signal OUT2 have been obtained based on the first compensated instruction value IS1* and the reactor current ILr.

As shown in FIG. 8C, the first control part 50 transmits the first output signal OUT1 as the first gate signal GS1 and the second output signal OUT2 as the second gate signal GS2 to the first switch SW1 and the second switch SW2 in synchronization with the rising timing of the first clock signal CLK1 at timing t12 and timing t13.

The motor 260, i.e. the motor vehicle is switched from the powering operation mode to the regenerative operation mode after timing t13, and the reactor current ILr is switched from a positive polarity to a negative polarity.

After timing t14, the first control part 50 transmits the third output signal OUT3 as the first gate signal GS1 and the fourth output signal OUT4 as the second gate signal GS2, where the third output signal OUT3 and the fourth output signal OUT4 have been obtained based on the second compensated instruction value IS2* and the reactor current ILr.

Because the rising time when the second clock signal CLK2 rises is shifted from the rising time when the first clock signal CLK1 rises by a half period (Tsw/2), the third output signal OUT3 becomes the turning-on instruction in synchronization with the rising time t14 of the second clock signal CLK2 shown in FIG. 8B and FIG. 8D. FIG. 8D further shows a comparative example, designated by the dotted line, which represents the third output signal OUT3 which becomes the turning-on instruction in synchronization with the rising time t15 of the first clock signal CLK1. As clearly shown in FIG. 8D, the time t15 at which the third output signal OUT3 usually becomes the turning-on instruction is delayed from the time t14 at which the third output signal OUT3 actually becomes the turning-on instruction.

The control device 30-2 adjusts the rising time when the second clock signal CLK2 rises to be shifted or delayed from the rising time when the first clock signal CLK1 rises by a half period (Tsw/2) at the time when the control device 30-2 switches the voltage step-down control to the voltage boost control. This control makes it possible to move forward the time when the first output signal OUT1 becomes the tuning-on instruction when compared with a case in which the first clock signal CLK1 and the second clock signal CLK2 have the same phase, i.e. are transmitted simultaneously or in synchronization with each other.

As previously described, the control device 30-2 according to the second exemplary embodiment performs the control of the first control part 50 and the second control part 60 so that the output time of the turning-on instruction of the second switch SW2 determined by the second control part 60 is delayed by a half period (Tsw/2) from the output time of the turning-on instruction of the first switch SW1 determined by the first control part 50. This control makes it possible to suppress a delay due to the switching of the instruction current during a period from a time when the turning-on operation of the first switch SW1 and the second switch SW2 is started to a time when the polarity of the reactor current ILr is changed.

Third Exemplary Embodiment

A description will be given of the control device 30-3 according to a third exemplary embodiment of the present disclosure with reference to FIG. 9, FIG. 10A and FIG. 10B.

Figure 9:
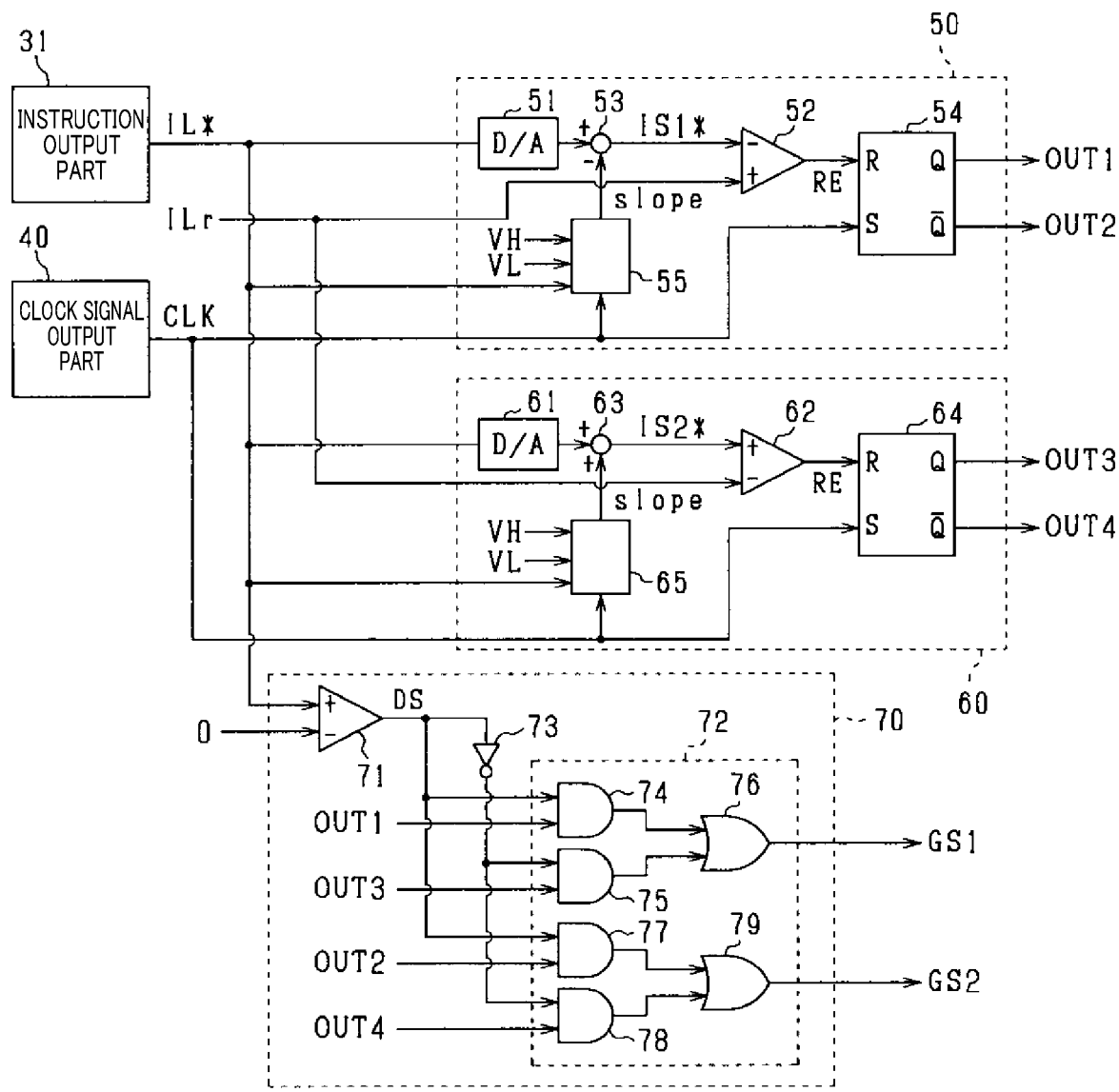
FIG. 9 is a view showing functional blocks of the control device in the DC-DC converter according to a third exemplary embodiment of the present disclosure.

FIG. 9 is a view showing functional blocks of the control device 30-3 in the DC-DC converter 10 according to the third exemplary embodiment of the present disclosure.

The same components between the third exemplary embodiment and the first exemplary embodiment will be referred to with the same reference numbers and characters, and the explanation of the same components is omitted for brevity.

When a time ratio of each of the first switch SW1 and the second switch SW2 exceeds 50%, a low frequency oscillation easily occurs in the first switch SW1 and the second switch SW2. This time ratio represents a ratio Ton/Tsw of the turned-on period Ton to the switching period Tsw. In particular, the lower the terminal voltage of the battery 200 is, the longer the period until the reactor current ILr reaches the instruction current IL* during the voltage step-down period of the DC-DC converter 10, and the time ratio easily increases. In order to avoid this, the first compensator 55 and the second compensator 65 in the control device 30-2 according to the third exemplary embodiment calculate the slope compensation signal Slope by using a different calculation method in each of the voltage boost control and the voltage step-down control performed by the DC-DC converter 10.

The first compensator 55 and the second compensator 65 correspond to a compensation signal calculation part.

FIG. 9 shows the functional blocks of the control device 30-3 according to the third exemplary embodiment. As shown in FIG. 9, the first compensator 55 receives the instruction current IL* transmitted from the instruction output part 31. Similarly, the second compensator 65 receives the instruction current IL* transmitted from the instruction output part 31. That is, the first compensator 55 and the second compensator 65 perform a different method of calculating the slope compensation signal Slope on the basis of a polarity of the received instruction current IL*.

Figure 10A:
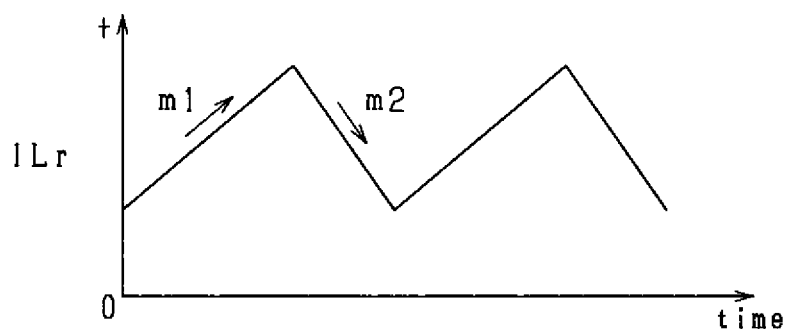
FIG. 10A and FIG. 10B are views showing a method of calculating a slope compensation signal Slope performed by the first compensator and the second compensator in the control device according to the third exemplary embodiment shown in FIG. 9.
Figure 10B:
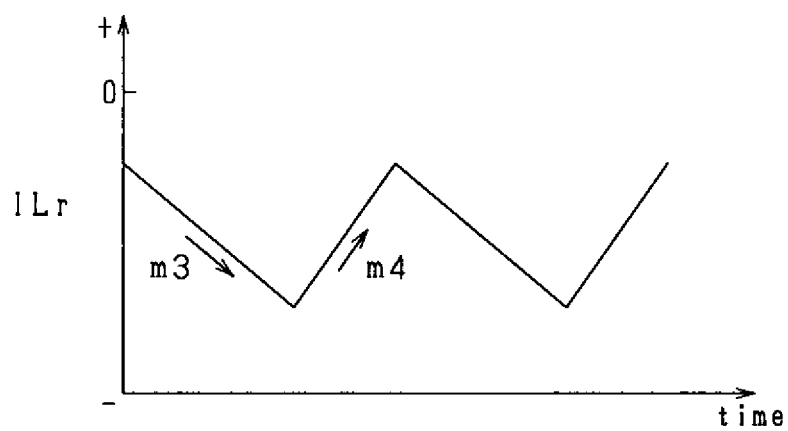

FIG. 10A and FIG. 10B are views showing the method of calculating the slope compensation signal Slope performed by the first compensator 55 and the second compensator 65 in the control device 30-3 according to the third exemplary embodiment shown in FIG. 9. In more detail, FIG. 10A explains the method of calculating a slope Ms of the slope compensation signal Slope during the voltage boost control period. FIG. 10B explains the method of calculating the slope Ms of the slope compensation signal Slope during the voltage step-down control period.

As shown in FIG. 10A, each of the first compensator 55 and the second compensator 65 in the control device 30-3 uses a following equation (1) so as to calculate a slope m1 of the reactor current ILr having a positive polarity during the voltage boost control period. Further, each of the first compensator 55 and the second compensator 65 uses a following equation (2) so as to calculate a slope m2 of the reactor current ILr having a positive polarity during the voltage step-down control period.

$$m1 = VL/L \tag{1}, and$$

$$m2 = (VL - VH)/L \tag{2},$$

where L represents an inductance of the reactor 13.

The greater the slope m2 of the reactor current ILr during the voltage step-down control period becomes, the higher the time ratio is. Accordingly, during the voltage boost control period, it is sufficient to satisfy the following condition (3) so as to avoid a low frequency oscillation from occurring in the first switch SW1 and the second switch SW2.

$$m2/2 <= Ms <= m2 \tag{3}.$$

During the voltage boost control period, the first compensator 55 and the second compensator 65 calculate the slope Ms of the slope compensation signal Slope which satisfies the equation (3) previously described on the basis of the high side voltage VH detected by the first voltage sensor 21 and the low side voltage VL detected by the second voltage sensor 23.

During the voltage boost control period, the first compensator 55 calculates the first compensated instruction value IS1* as a subtraction result obtained by subtracting the slope compensation signal Slope corresponding to the slope Ms calculated by using the equation (3) from instruction current IL*.

During the voltage boost control period, the second compensator 65 calculates the second compensated instruction value IS2* as an addition result obtained by adding the slope compensation signal Slope corresponding to the slope Ms calculated by using the equation (3) to the instruction current IL*.

As shown in FIG. 10B, each of the first compensator 55 and the second compensator 65 in the control device 30-3 uses a following equation (4) so as to calculate a slope m3 of the reactor current ILr having a negative polarity during the voltage step-down control period. Further, each of the first compensator 55 and the second compensator 65 uses a following equation (5) so as to calculate a slope m2 of the reactor current ILr having a negative polarity during the voltage step-down control period.

$$m3 = -(VL - VH)/L \tag{4}, and$$

$$m4 = -VL/L \tag{5}.$$

During the voltage step-down control period, it is sufficient to satisfy the following condition (6) so as to avoid a low frequency oscillation from occurring in the first switch SW1 and the second switch SW2.

$$m4/2 <= Ms <= m4 \tag{6}.$$

During the voltage step-down control period, the first compensator 55 and the second compensator 65 calculate the slope Ms of the slope compensation signal Slope which satisfies the equation (6) previously described on the basis of the low side voltage VL detected by the second voltage sensor 23.

During the voltage step-down control period, the first compensator 55 calculates the first compensated instruction value IS1* as a subtraction result obtained by subtracting the slope compensation signal Slope corresponding to the slope Ms calculated by using the equation (6) from instruction current IL*.

During the voltage step-down control period, the second compensator 65 calculates the second compensated instruction value IS2* as an addition result obtained by adding the slope compensation signal Slope corresponding to the slope Ms calculated by using the equation (3) to the instruction current IL*.

As previously described, in the structure of the control device 30-3 according to the third exemplary embodiment, the first compensator 55 and the second compensator 65 calculate the slope compensation signal Slope on the basis of a high side voltage VH and a low side voltage VL during the voltage boost control period. Further, the first compensator 55 and the second compensator 65 calculate the slope compensation signal Slope on the basis of a low side voltage VL during the voltage step-down control period. This makes it possible to suppress the first switch SW1 and the second switch SW2 from generating a low frequency oscillation during the voltage boost control period and the voltage step-down control period.

The first compensator 55 subtracts the slope compensation signal Slope from instruction current IL* and adjusts, i.e. compensates the instruction current IL* on the basis of the subtraction result. On the other hand, the second compensator 65 adds the slope compensation signal Slope to the instruction current IL* so as to adjust the instruction current IL*. This makes it possible to commonly use the slope compensation signal Slope before and after the variation of a polarity of the reactor current IL even if the reactor current IL changes in its polarity. This makes it possible for the control device 30-3 to reduce a calculation load of calculating the slope compensation signal Slope.

Modification of the Third Exemplary Embodiment

A description will be given of a modification of the control device 30-3 according to the third exemplary embodiment with reference to FIG. 11.

Figure 11:
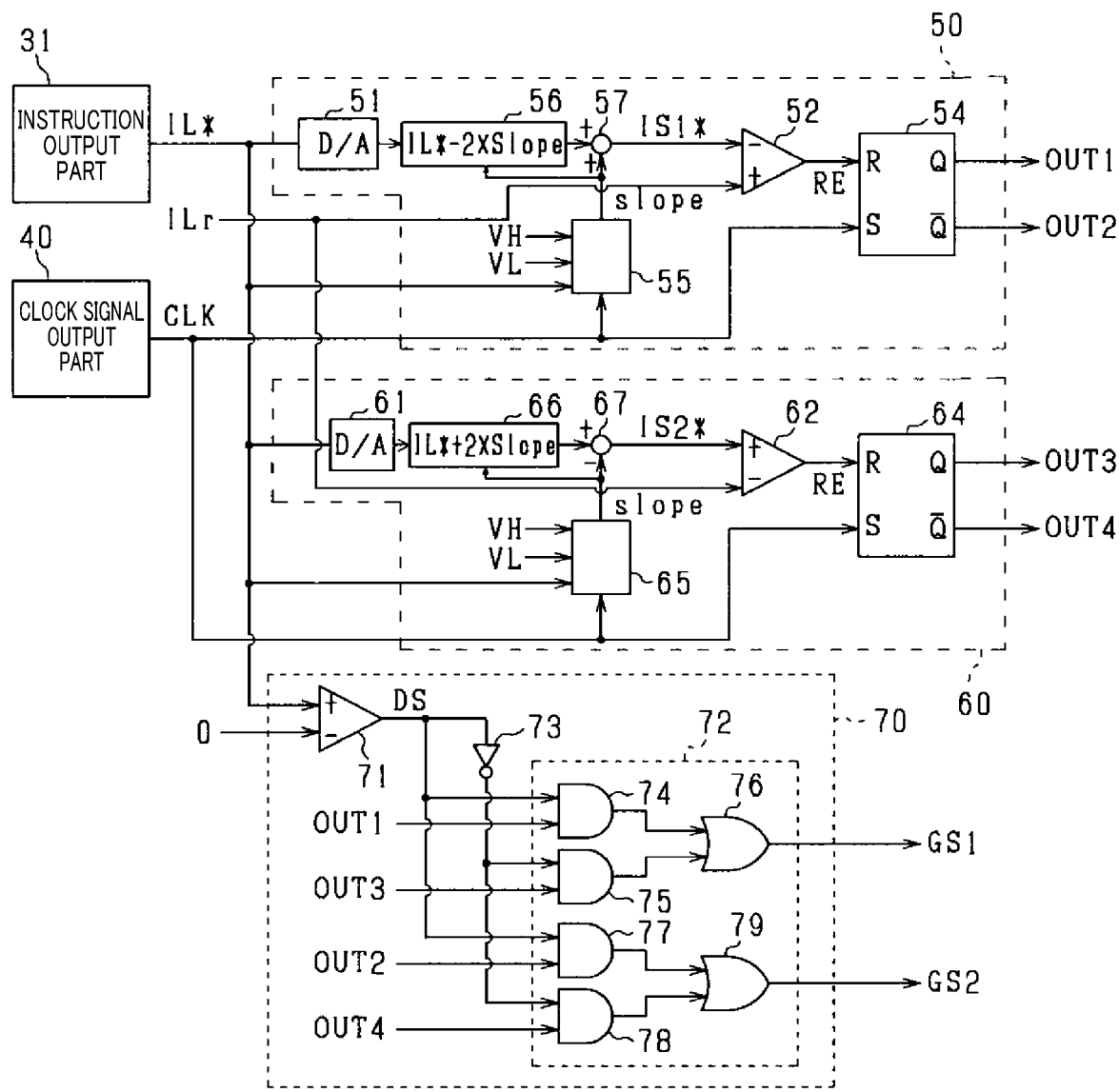
FIG. 11 is a view showing the functional blocks of the control device in the DC-DC converter according to a modification of the third exemplary embodiment shown in FIG. 9.

FIG. 11 is a view showing the functional blocks of the control device 30-3 in the DC-DC converter 10 according to a modification of the third exemplary embodiment shown in FIG. 9. As shown in FIG. 11, it is acceptable for the first compensator 55 to adjust, i.e. correct the instruction current IL* by adding the slope compensation signal Slope to the instruction current IL*. It is further acceptable for the second compensator 65 to adjust the instruction current IL* by subtracting the slope compensation signal Slope from the instruction current IL*.

As shown in FIG. 11, the first control part 50 has a first current compensation part 56 and an adder 57. The first current compensation part 56 adjusts, i.e. corrects the instruction current IL* on the basis of the slope compensation signal Slope calculated by the first compensator 55. Specifically, in the control device according to the modification of the third exemplary embodiment, the first current compensation part 56 subtracts a value twice of the slope compensation signal Slope from the instruction current IL*, and transmits this subtraction result as the corrected instruction current IL* to the adder 57

The adder 57 receives the corrected instruction current IL* and the slope compensation signal Slope, and adds them together. The adder 57 transmits this addition result as the first compensated instruction value IS1* to the first comparator 52.

Further, as shown in FIG. 11, the second control part 60 has a second current compensation part 66 and a subtractor 67. The second current compensation part 66 adjusts, i.e. corrects the instruction current IL* on the basis of the slope compensation signal Slope calculated by the second compensator 65. Specifically, in the control device according to the modification of the third exemplary embodiment, the second current compensation part 66 adds a value twice of the slope compensation signal Slope to the instruction current IL*, and transmits this addition result as the corrected instruction current IL* to the subtractor 67.

The subtractor 67 receives the corrected instruction current IL* and the slope compensation signal Slope, and subtracts the slope compensation signal Slope from the corrected instruction current IL*. The subtractor 67 transmits this subtraction result as the second compensated instruction value IS2* to the second comparator 62.

As previously described, it is possible for the modification of the control device according to the third exemplary embodiment to have the same effects as the control device 30-3 according to the third exemplary embodiment.

Fourth Exemplary Embodiment

A description will be given of the DC-DC converter 10-1 having the control device 30 according to a fourth exemplary embodiment of the present disclosure with reference to FIG. 12.

Figure 12:
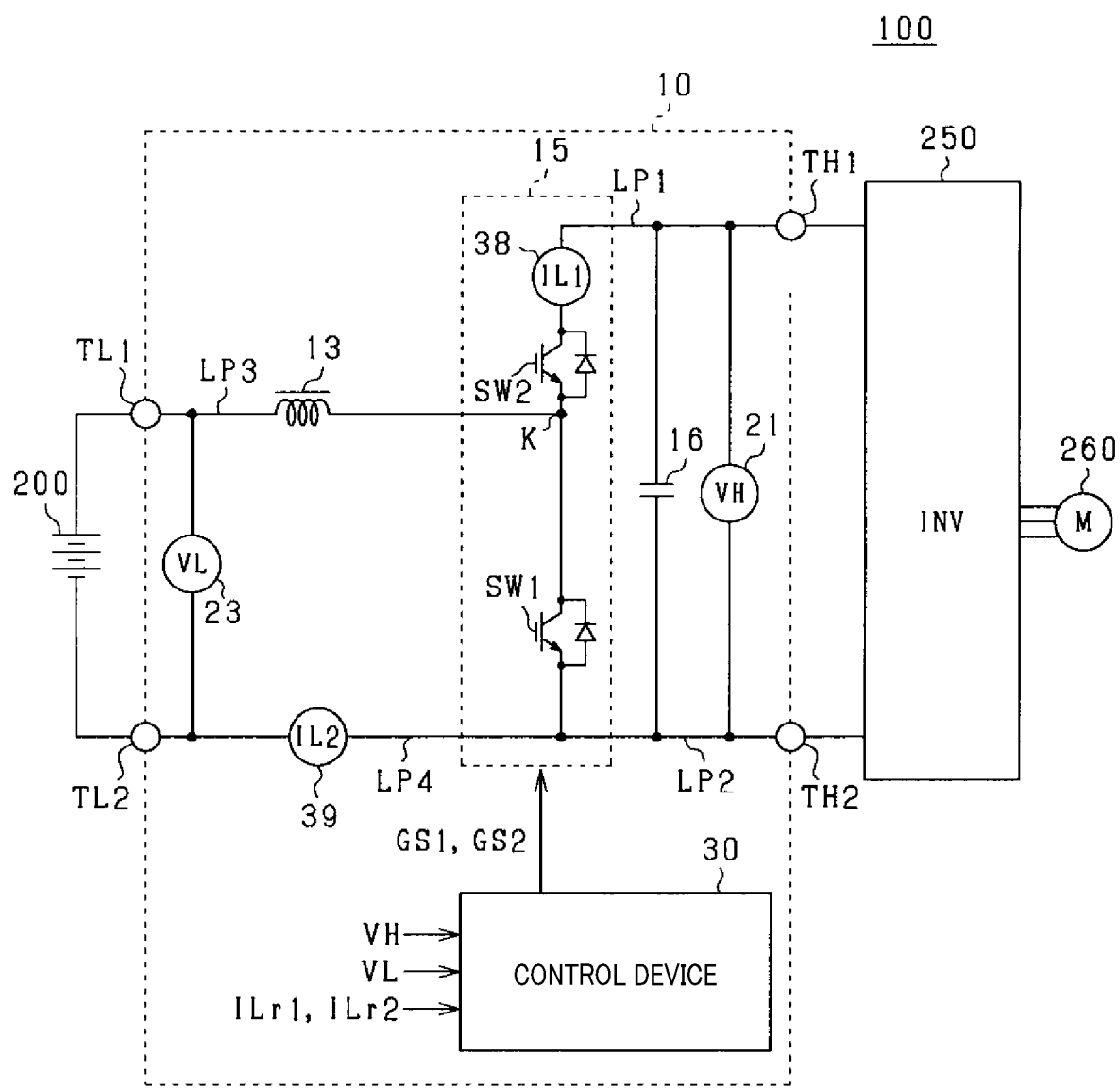
FIG. 12 is a view showing a structure of a DC-DC converter according to a fourth exemplary embodiment of the present disclosure.

FIG. 12 is a view showing a structure of the DC-DC converter 10-1 according to the fourth exemplary embodiment of the present disclosure. The same components between the fourth exemplary embodiment and the first exemplary embodiment will be referred to with the same reference numbers and characters, and the explanation of the same components is omitted for brevity.

As shown in FIG. 12, the DC-DC converter 10-1 according to the fourth exemplary embodiment of the present disclosure has a first current sensor 38 and a second current sensor 39. The first current sensor 38 detects the reactor current ILr to be used by the first control part 50. The second current sensor 39 detects the reactor current ILr to be used by the second control part 60.

In the structure of the DC-DC converter 10-1 according to the fourth exemplary embodiment shown in FIG. 12, the first current sensor 38 is arranged at the collector side of the second switch SW2. Further, the second current sensor 39 is arranged on the fourth wiring LP4. The first control part 50 performs the peak current mode control using the first reactor current IL1r detected by the first current sensor 38. The second control part 60 performs the peak current mode control using the second reactor current IL2r detected by the second current sensor 39.

As previously described, it is possible for the DC-DC converter 10-1 having the control device 30 according to the fourth exemplary embodiment to have the same effects as the DC-DC converter 10 according to the first exemplary embodiment.

Fifth Exemplary Embodiment

A description will be given of a DC-DC converter 150 having the control device 30 according to a fifth exemplary embodiment of the present disclosure with reference to FIG. 13.

Figure 13:
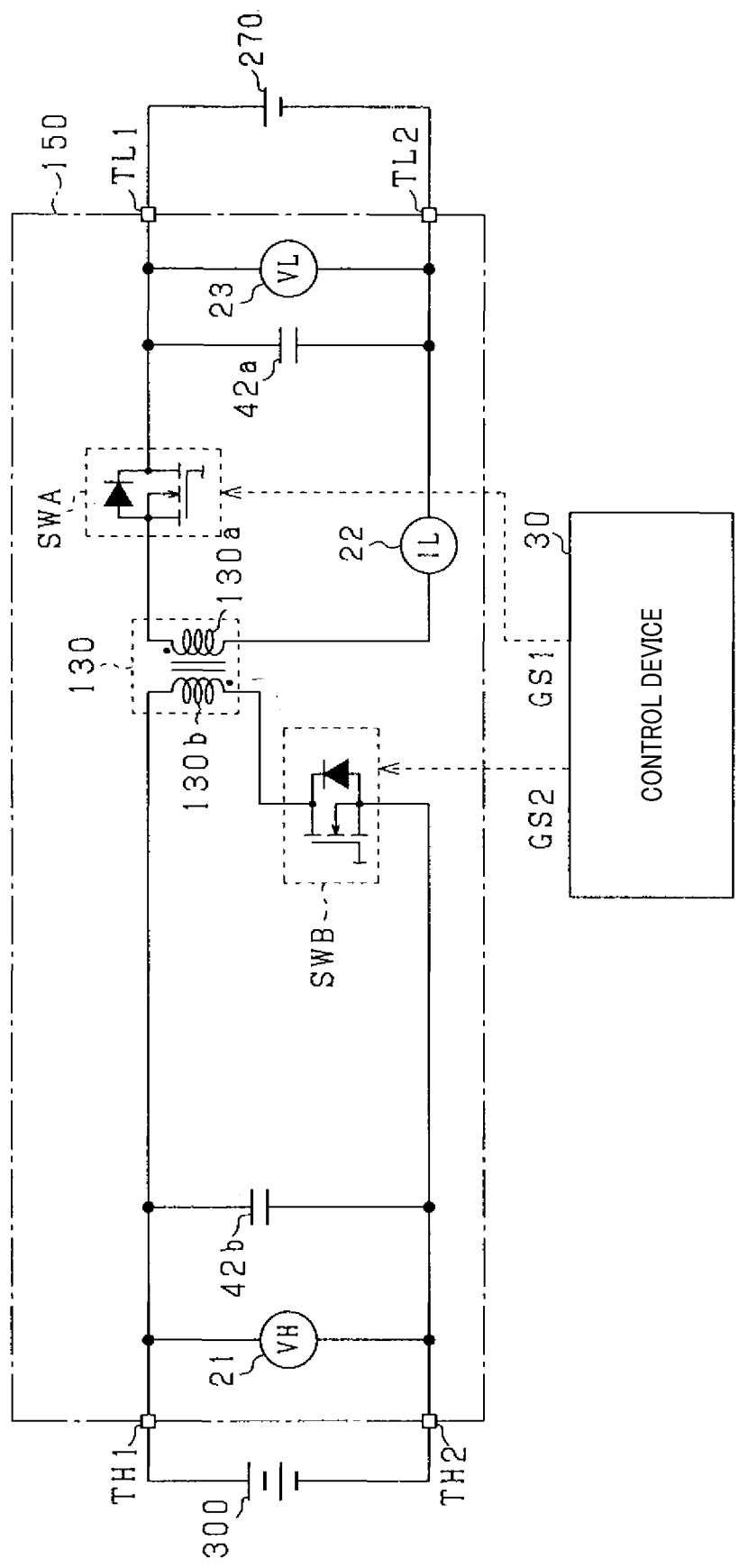
FIG. 13 is a view showing a structure of a DC-DC converter according to a fifth exemplary embodiment of the present disclosure.

FIG. 13 is a view showing a structure of the DC-DC converter 150 according to the fifth exemplary embodiment.

The same components between the fifth exemplary embodiment and the first exemplary embodiment will be referred to with the same reference numbers and characters, and the explanation of the same components is omitted for brevity.

As shown in FIG. 13, the DC-DC converter 150 according to the fifth exemplary embodiment has an insulation-type power converter equipped with a first battery 270 and a second battery 300. The DC-DC converter 150 according to the fifth exemplary embodiment performs a bidirectional electric power transmission between the second battery 300.

In more detail, as shown in FIG. 13, the DC-DC converter 150 has a transformer 130 composed of a first winding 130a and a second winding 130b. The first winding 130a and the second winding 130b correspond to a reactor. A terminal voltage of the first battery 270 is higher than that of the second battery 300.

As shown in FIG. 13, one terminal of a second capacitor 42b is connected to a first high voltage side terminal TH1 of the DC-DC converter 150 second battery 300. The other terminal of the second capacitor 42b is connected to a second high voltage side terminal TH2 of the DC-DC converter 150. A second switch SWB and the second winding 130b form a second series connection unit. This second series connection unit is connected in parallel to the second capacitor 42b. As previously described, the first winding 130a and the second winding 130b form the transformer 130.

In the transformer 130, the first winding 130a is magnetically connected with the second winding 130b. A first switch SWA and a first capacitor 42a form a first series connection unit. The first series connection unit is connected in parallel with the first winding 130a.

As shown in FIG. 13, one terminal of the first capacitor 42a is connected to the first switch SWA and a first low voltage side terminal TL1 of the DC-DC converter 150 second battery 300.

The other terminal of the first capacitor 42a is connected to a second low voltage side terminal TL2 of the DC-DC converter 150.

In the structure of the DC-DC converter 150 according to the fifth exemplary embodiment, a current flowing from the first switch SWA to the first winding 130a has a positive polarity, and a current flowing from the current sensor 22 to the first switch SWA has a negative polarity. Further, a current flowing from the first high voltage side terminal TH1 to the second switch SWB through the second winding 130b has a positive polarity. A current flowing from the second switch SWB to the second winding 130b toward the first high voltage side terminal TH1 has a negative polarity.

A description will be given of the voltage boost control performed by the DC-DC converter 150 according to the fifth exemplary embodiment.

During the voltage boost control period, the first switch SWA is turned on by the received first gate signal GS1 transmitted from the control device 30, and the second switch SWB is turned off by the received second gate signal GS2 transmitted from the control device 30. This allows the first battery 270 to be connected to the first winding 130a through the first switch SWA. A current flows from the first battery 270 to the first winding 130a. The transformer 130 is charged with magnetic energy. After this, when the first switch SWA is turned off, and the second switch SWB is turned on, the magnetic energy charged in the transformer 130 is discharged, and a current flows from the second winding 130b to the second battery 300. The repetition of the processes previously described makes it possible to supply electric power of the first battery 270 to the second battery 300. The second battery 300 is charged.

Next, a description will now be given of the voltage step-down control performed by the DC-DC converter 150 according to the fifth exemplary embodiment.

During the voltage step-down control period, the second switch SWB is turned on by the received second gate signal GSs transmitted from the control device 30, and the first switch SWA is turned off by the received first gate signal GS1 transmitted from the control device 30. This allows the second battery 300 to be connected to the second winding 130b through the second switch SWB and a current flows from the second battery 300 to the second winding 130b. The transformer 130 is charged with magnetic energy.

After this, when the second switch SWB is turned off on the basis of the received second gate signal GS2, and the first switch SWA is turned on the basis of the received first gate signal GS1. The magnetic energy charged in the transformer 130 is discharged, and a current flows from the first winding 130a to the first battery 270. The repetition of the processes previously described makes it possible to supply electric power of the second battery 300 to the first battery 270, and to charge the first battery 270.

As previously described, it is possible for the DC-DC converter 150 having the control device 30 according to the fifth exemplary embodiment to have the same effects as the DC-DC converter 10 according to the first exemplary embodiment.

Various Modifications

The concept of the present disclosure is not limited by the first to fifth exemplary embodiments previously described. It is possible for the control device and the EC-EC converter according to the present disclosure to have various modifications. For example, it is acceptable for the fifth exemplary embodiment to have energy charging devices instead of using the first battery 270 and the second battery 300.

It is possible for the first to fourth exemplary embodiments to perform the compensation by adding the slope compensation signal Slope to the reactor current ILr or by subtracting the slope compensation signal Slope from the reactor current ILr.

It is possible for each of the first to fourth exemplary embodiments to use metal oxide semiconductor field effect transistors (MOS FETs) instead of using insulated gate bipolar transistors (IGBTs).

As previously described in detail, in the control device for a DC-DC converter according to the present disclosure, the first control part and the second control part perform simultaneously the peak current mode control using the reactor current of a positive polarity and the peak current mode control calculation using the reactor current of a negative polarity.

During the voltage boost control, the first control part determines the turning on/off instruction for the first switch. On the other hand, during the voltage step-down control, the second control part determines the turning on/off instruction for the second switch.

Specifically, during the voltage boost control, the first control part selects the turning on instruction and transmits the selected turning on instruction to the first switch until the reactor current reaches the positive instruction current due to the increasing of the reactor current having a positive polarity. The first switch is turned on based on the received turning on instruction. After the reactor current has reached the positive instruction current, the first control part selects the turning-off instruction and transmits the selected turning off instruction to the first switch. The first switch is turned off based on the received turning on instruction.

During the voltage step-down control, the second control part selects the turning on instruction and transmits the selected turning on instruction to the second switch until the reactor current reaches the negative instruction current due to the reduction of the reactor current having a negative polarity. The second switch is turned on based on the received turning on instruction. After the reactor current has reached the negative instruction current, the second control part selects the turning-off instruction and transmits the selected turning off instruction to the second switch. The second switch is turned off based on the received turning on instruction.

Accordingly, it is possible for the control device according to the present disclosure to quickly switch, according to the variation of the polarity of the reactor current, the turning on/off control of the first switch based on the reactor current of a positive polarity and the turning on/off control of the second switch based on the reactor current of a negative polarity. This structure and behavior allows the control device to continuously and correctly adjust the reactor current on the basis of the peak current mode control before and after the change in polarity of the reactor current.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A control device for a DC-DC converter, the DC-DC converter comprising a first switch, a second switch, a reactor, a low voltage side terminal and a high voltage side terminal, the DC-DC converter performing a voltage boost control and a voltage step-down control, where a current is supplied to the reactor through the low voltage side terminal by operation of turning the first switch to an on state, and energy accumulated in the reactor is discharged by operation of turning the first switch to an off state to boost a DC voltage supplied from the low voltage side terminal and to supply the boosted DC voltage to the high voltage side terminal during the voltage boost control, and a current is supplied to the reactor through the high voltage side terminal by operation of turning the second switch to the on state, and an energy accumulated in the reactor is discharged by operation of turning the second switch to the off state to reduce a DC voltage supplied from the high voltage side terminal, and to supply the reduced DC voltage to the low voltage side terminal during the voltage step-down control, the control device comprising:

a computer programmed to:
acquire a reactor current supplied from a current sensor detecting the reactor current flowing in the reactor, where the reactor current has a positive polarity when flowing through the reactor from the low voltage side terminal to the high voltage side terminal in the DC-DC converter, and the reactor current has a negative polarity when flowing through the reactor from the high voltage side terminal to the low voltage side terminal in the DC-DC converter;
output a positive instruction current during a voltage boost control period in which the DC-DC converter performs the voltage boost control, and output a negative instruction current during a voltage step-down control period in which the DC-DC converter performs the voltage step-down control;
output a first switch turning-on instruction, so as to turn on the first switch, until the reactor current reaches the positive instruction current in a first switch switching period, and output a first switch turning-off instruction, so as to turn off the first switch, when the reactor current reaches the positive instruction current;
output a second switch turning-on instruction, so as to turn on the second switch, until the reactor current reaches the negative instruction current in a second switch switching period, and output a second switch turning-off instruction, so as to turn off the second switch, when the reactor current reaches the negative instruction current;
select the first switch turning-on instruction or the first switch turning-off instruction transmitted during the voltage boost control period, and transmit, to the first switch, the selected first switch turning-on instruction or the selected first switch turning-off instruction, and select the second switch turning-on instruction or the second switch turning-off instruction transmitted during the voltage step-down control period, and transmit, to the second switch, the selected second switch turning-on instruction or the selected second switch turning-off instruction;
acquire a low DC voltage as a low side voltage detected by a first voltage sensor and to be supplied to the low voltage side terminal;
acquire a high DC voltage as a high side voltage detected by a second voltage sensor and to be supplied to the high voltage side terminal;
calculate a slope compensation signal to adjust the positive instruction current and the negative instruction current based on the acquired low side voltage and the acquired high side voltage during the voltage boost control period, and calculate the slope compensation signal based on the acquired low side voltage during the voltage step-down control period; and
adjust the positive instruction current and the negative instruction current based on the calculated slope compensation signal.

2. The control device for a DC-DC converter according to claim 1, wherein
the first switch switching period has a time length which is the same as a time length of the second switch switching period, and
the computer is programmed to output the second switch turning-on instruction after the first switch turning on instruction is output at a timing which is delayed by half of a period of the first switching period from a point at which the first switch turning-on instruction is output.

3. The control device for a DC-DC converter according to claim 1, wherein the computer is programmed to:
detect that the DC-DC converter performs the voltage boost control when receiving the positive instruction current, and detect that the DC-DC converter performs the voltage step-down control when receiving the negative instruction current.

4. The control device for a DC-DC converter according to claim 2, wherein the computer is programmed to:

detect that the DC-DC converter performs the voltage boost control when receiving the positive instruction current, and detect that the DC-DC converter performs the voltage step-down control when receiving the negative instruction current.

5. The control device for a DC-DC converter according to claim 1, wherein the computer is programmed to:

detect that the DC-DC converter performs the voltage boost control when the reactor current has a positive polarity, and detect that the DC-DC converter performs the voltage step-down control when the reactor current has a negative polarity.

6. The control device for a DC-DC converter according to claim 2, wherein the computer is programmed to:

detect that the DC-DC converter performs the voltage boost control when the reactor current has a positive polarity, and detect that the DC-DC converter performs the voltage step-down control when the reactor current has a negative polarity.

7. The control device for a DC-DC converter according to claim 4, wherein the computer is programmed to:

detect that the DC-DC converter performs the voltage boost control when the reactor current has a positive polarity, and detect that the DC-DC converter performs the voltage step-down control when the reactor current has a negative polarity.

8. The control device for a DC-DC converter according to claim 5, wherein the computer is programmed to:

detect that the DC-DC converter performs the voltage boost control when receiving the positive instruction current, and detect that the DC-DC converter performs the voltage step-down control when receiving the negative instruction current.

* * * * *